(12) United States Patent
Kim et al.

(10) Patent No.: US 11,810,472 B2
(45) Date of Patent: Nov. 7, 2023

(54) ULTRASONIC SOUND GUIDE SYSTEM FOR THE VISUALLY IMPAIRED

(71) Applicants: Kevin Saeyun Kim, Macon, GA (US); Saea Kim, Macon, GA (US); Tae Anthony Choi, Macon, GA (US)

(72) Inventors: Kevin Saeyun Kim, Macon, GA (US); Saea Kim, Macon, GA (US); Tae Anthony Choi, Macon, GA (US)

(*) Notice: Subject to any disclaimer, the term of this patent is extended or adjusted under 35 U.S.C. 154(b) by 201 days.

(21) Appl. No.: 17/396,694

(22) Filed: Aug. 7, 2021

(65) Prior Publication Data
US 2023/0040894 A1    Feb. 9, 2023

(51) Int. Cl.
*G09B 21/00* (2006.01)
*G01C 21/20* (2006.01)

(52) U.S. Cl.
CPC ........... *G09B 21/006* (2013.01); *G01C 21/20* (2013.01)

(58) Field of Classification Search
None
See application file for complete search history.

(56) References Cited

U.S. PATENT DOCUMENTS

| | | | |
|---|---|---|---|
| 2016/0239710 A1* | 8/2016 | Chen | G06F 3/14 |
| 2019/0246218 A1* | 8/2019 | Hertzberg | G02C 11/06 |
| 2021/0121331 A1* | 4/2021 | Nikolovski | G01S 15/88 |
| 2022/0021764 A1* | 1/2022 | Seshadri | G09B 21/007 |

* cited by examiner

Primary Examiner — Thomas S McCormack

(57) ABSTRACT

The ultrasonic sound guide system presents the audio broadcasting system based on the inaudible ultrasonic sound to assist the indoor and outdoor navigation of the visually impaired. The transmitters are placed at the point of interest to propagate the frequency modulated voice signal in ultrasonic sound range. The receiver device is carried by the visually impaired in wearable device form to receive the ultrasonic sound for the voice signal via demodulation. Since the ultrasonic sound demonstrates the acoustic properties, the directivity, attenuation, and superposition of ultrasonic sound provide the acoustic clue to the receiver device user for localizing the transmitter positions. The visually impaired hear the designated voice signal and follow the signal strength to arrive at the specific location. The ultrasonic sound guide system is useful device to localize the place in near field without touching the braille. The receiver device can be any independent form such as eyeglasses, neckband, walking cane attachment device, hand-held device, etc. those are not blocking the ear canal. Also, the receiver device can be realized by smartphone application software using the hardware and sensors in the smartphone.

19 Claims, 18 Drawing Sheets

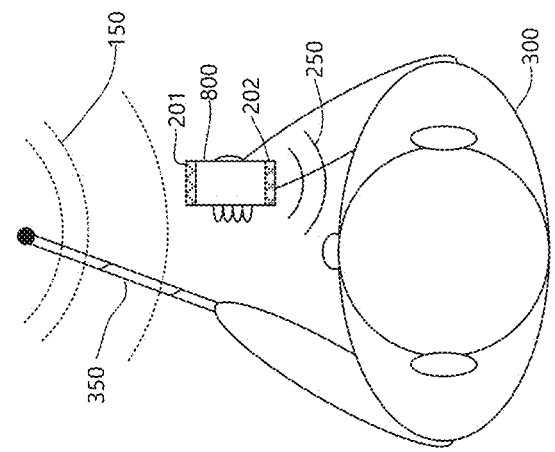
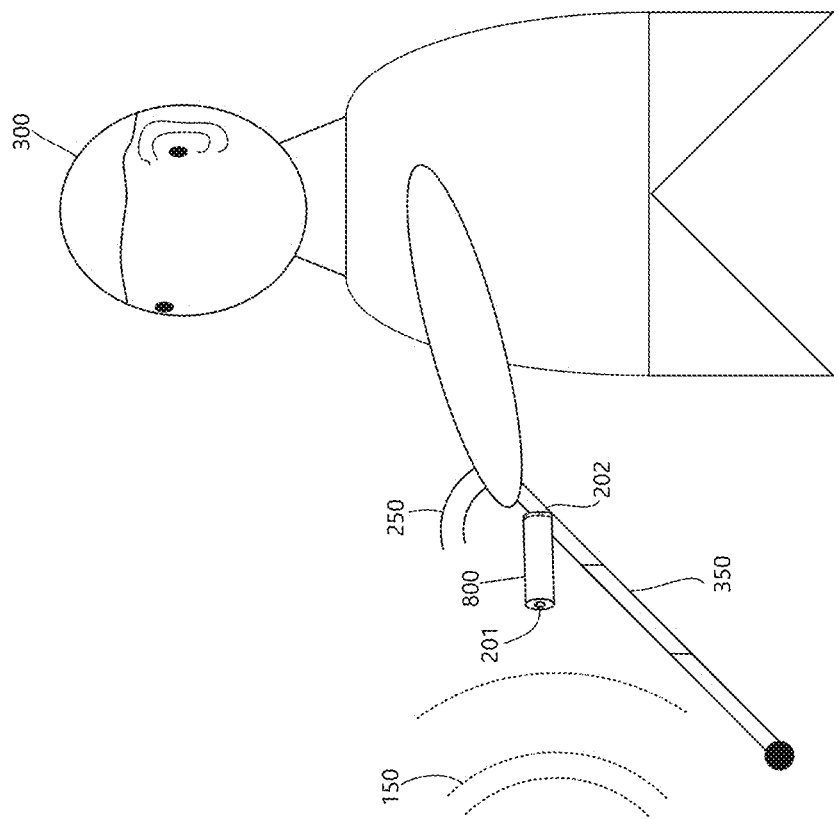
FIG. 16

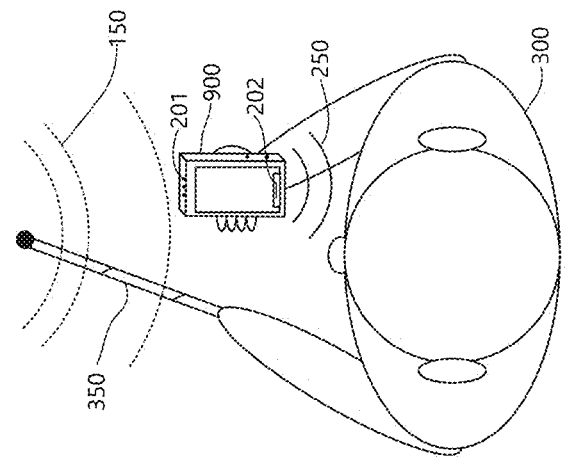
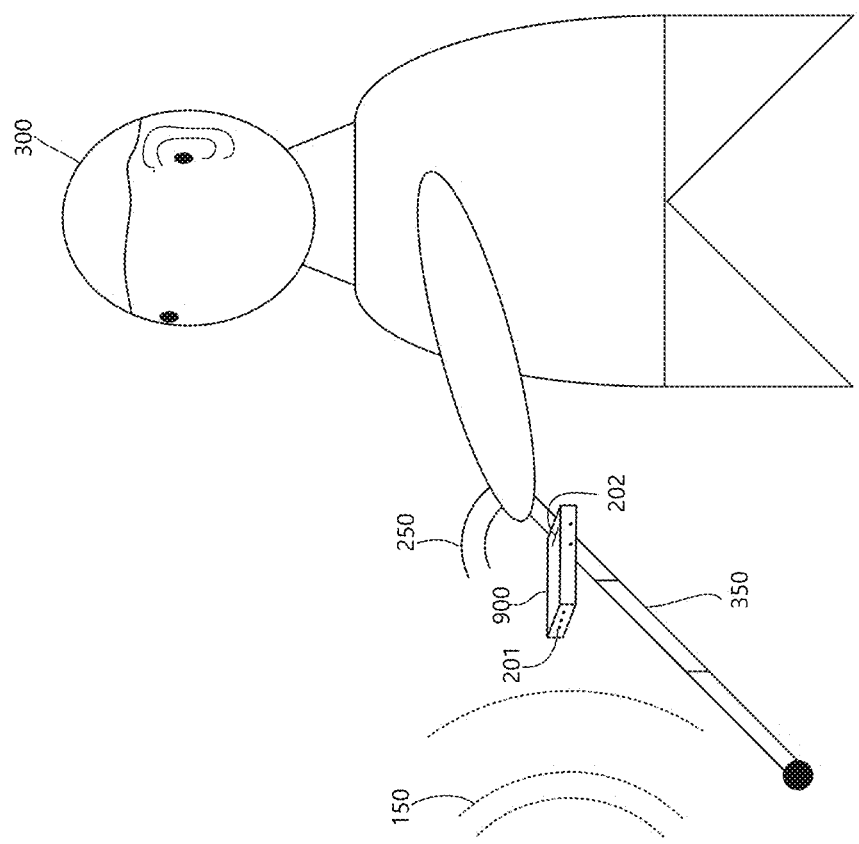
FIG. 18

ULTRASONIC SOUND GUIDE SYSTEM FOR THE VISUALLY IMPAIRED

CROSS-REFERENCE TO RELATED APPLICATIONS

No prior-filed copending nonprovisional patent applications and no provisional patent application related to this application.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISC APPENDIX

Not applicable.

BACKGROUND OF THE INVENTION

The visually impaired (someone who is blind or has uncorrectable eyesight to a near normal level; also named the user in this invention) have experienced various difficulties to navigate their way through the situations. The conventional methods such as service dog, walking cane, tactile braille, audio alarm, etc. improve the safety and efficiency of the navigation. Recently, the smart devices based on the global positioning system (GPS), cameras, and sensors provide the haptic and/or audio information to the visually impaired for delivering the context around them. However, the navigation is still challenging in the final phase due to the position ambiguity of the destination. With lack of visual information, the visually impaired cannot specify the accurate destination position unless they have a priori experience. The indoor navigation deteriorates the destination ambiguity further because of the structure similarity between locations. The smart devices may find the pinpoint location by using the cameras and sensors; however, the information delivery to the user is still confronted problem. Note that the smart devices require the implementation complexity with inconsistent performance in general.

The simple solution to the challenges of the final phase navigation is that someone speaks the location name at the destination. The sound localization capability of human finds the destination location by nature. The direction and distance to the destination is speculated by the arrival signal difference between ears based on the magnitude, time, and frequency. The audio speaker with pre-recorded message or signal may provide the solution to the final phase navigation. The audio based assistive devices are realized and deployed at the streets and sidewalks, especially in intersections. The signal pole location and pedestrian crossing direction are guided by the designated audio signals. The audio devices can be used for sports activities, point of interest identification, safe navigation, etc. of the visually impaired to support outdoor movements as well. The balance between the accessibility and environment is required to maintain the sustainability of the assistive devices based on audio signal. Because of the audible sound broadcasting, the audio-based devices demonstrate the limited installation locations.

The inaudible sound propagation with proper receiver device overcomes the installation problems since the information is delivered to the selective persons who possess the receiver device. The ultrasonic sound presents the frequency band beyond the audible range with acoustic properties which are the directivity, attenuation, and superposition of the signal. Hence, the audio signal carried by ultrasonic sound delivers the identical localization clues to the receiver device user by following the signal strength and delay. In order to improve the usability, the receiver device can be realized in the wearable or independent forms including eyeglasses, neckband, walking cane attachment device, and hand-held device. Also, the device should not obstruct the acoustic flow toward the ear canal to maintain the ambient sound localization capability of the visually impaired. The dual channel device configuration can improve the final phase navigation performance further by employing the human binaural localization capability explicitly. This invention consists of the transmitter broadcasting the audio signal over ultrasonic sound and the receiver device recovering the audio signal from the ultrasonic sound. The receiver can be implemented as the application software on the smartphone based on the microphones and speakers in the phone as well.

BRIEF SUMMARY OF THE INVENTION

This invention provides the proximity localization system and method for the visually impaired to improve the personal navigation performance in near destination situation. The system consists of transmitter and receiver device to broadcast and receive the ultrasonic sound, respectively. The transmitter is placed on the destination to deliver the specific audio signal for indicating the location information. The transmitter shifts the audible frequency to the ultrasonic frequency by using frequency shift; hence, the naked ear cannot hear the information. The receiver device is carried by the visually impaired to find the transmitter location via following the signal strength. The receiver in the device performs the demodulation by shifting the ultrasonic frequency to the audible frequency. The physical movement of the receiver device is required such as horizontal and vertical rotation in order to discover the transmitter direction. Once the visually impaired observe the direction by the movement, the user progresses to the direction and experiences the stronger audio from the receiver device. The direction and range between the transmitter and receiver device determine the audio signal attenuation factor similar to the acoustic sound characteristics.

The transmitter comprises the audio source, filter, frequency shift, amplifier, and speaker. The audio source delivers the pre-recorded audio signal for filter which limits the frequency range. The frequency shift transfers the band-limited audio signal into the ultrasonic signal. The amplifier and speaker propagate the ultrasonic signal into the air. The receiver in the device contains the microphone, filter, frequency shift, amplifier, and speaker. The microphone accepts the broad range of the acoustic signal. The filter selectively passes the ultrasonic signal to the frequency shift which recovers the audio signal from the ultrasonic signal. The amplifier and speaker produce the audible sound to the visually impaired. The transmitter and receiver can be realized by the various technologies including the digital and analog methods based on the digital-to-analog and analog-to-digital converter. For example, in the transmitter, the filter and frequency shift are performed by analog circuits after digital-to-analog converter. Also, the receiver can be implemented by the application software for the smartphones which already have the required hardware with microphone and speaker.

The transmitter has a high degree of freedom on shape as long as the speaker is placed under the acoustic hole for propagation. The transmitter may have acoustic guide structure on the speaker cone edge to control the ultrasonic sound directivity. The receiver device can be configured as wearable or independent form with single or dual channel structure. The wearable form can be the shape of eyeglasses and neckband device. The independent form can be the shape of walking cane attachment, hand-held, and smartphone device. The channel indicates the individual receiver processing path from the single microphone to the single speaker. The dual channel device independently receives the ultrasonic sound from two microphones which have the physical distance in between. The ear with individual speaker hears the sound from the channel with time and magnitude difference for human binaural sound localization. The single channel device requires the 3D physical movement in order to find the transmitter by monitoring the signal magnitude. The wearable devices can be realized as the dual channel device and the independent devices should be implemented as the single channel device. It is important that the visually impaired maintain the human sound localization capability; hence, the receiver device is necessary to be configured as open structure to keep the acoustic flow to the ear canal.

BRIEF DESCRIPTION OF SEVERAL VIEWS OF THE DRAWING

FIG. 16 illustrates a using example of hand-held receiver device.

FIG. 18 illustrates a using example of smartphone receiver device.

DETAILED DESCRIPTION OF THE INVENTION

The ultrasonic sound guide system provides the acoustic information to the visually impaired for identifying and localizing the sound source based on the ultrasonic sound. The sound source indicates the ultrasonic sound transmitter which is place on the purposed destination in the personal navigation. The ultrasonic sound is generated by the frequency shift on the voice spectrum to deliver the place name continuously and selectively. The receiver device carried by the visually impaired accepts the ultrasonic sound and shifts back in audible frequency for identifying the location. Also, the audible sound strength by the receiver device direction and distance presents the clue to find the transmitter location. Two receivers with physical distance between microphones can be configured as the dual channel device for further localization capability. The two speaker outputs from the dual channel device are delivered to the individual ears directly. The arrival sound difference in magnitude and time provides the enhanced sound localization performance based on the binaural sound localization by human. The ultrasonic sound guide system reduces the installation limitation since the information is selectively delivered to the receiver device by utilizing the inaudible ultrasonic sound.

The physical structure of the transmitter has the high degree of freedom as long as the speaker propagates the ultrasonic sound properly. The physical shape of the receiver device requires the careful design in order to maintain the surround spatial acoustic information of the visually impaired. The receiver device can be realized as the single or dual channel configuration. Each channel comprises the receiver hardware, microphone, speaker, and battery and each receiver device contains power switch and charging port. The single channel realization can be designed as the hand-held device and smartphone. Note that the smartphone realization is performed by the software without using any further hardware. The single channel device can be used with walking cane by attaching or hand-holding. The dual channel device can be implemented as the eyeglasses and neckband which includes the left and right channel receiver. The distance between the microphones in dual channel device is approximately equivalent to the ear distance of the user. The speaker outputs of the dual channel are directly provided to the individual ears in open structure. The dual channel device presents the spatial acoustic information of the transmitter as well as maintains the environmental sound over the user. The numerous transmitters can be localized by the single and dual channel device because of the conventional superposition of acoustic signals. The user can hear the multiple sounds from the receiver device and follow the desired sound strength and time delay for specific transmitter location.

Figure 1:
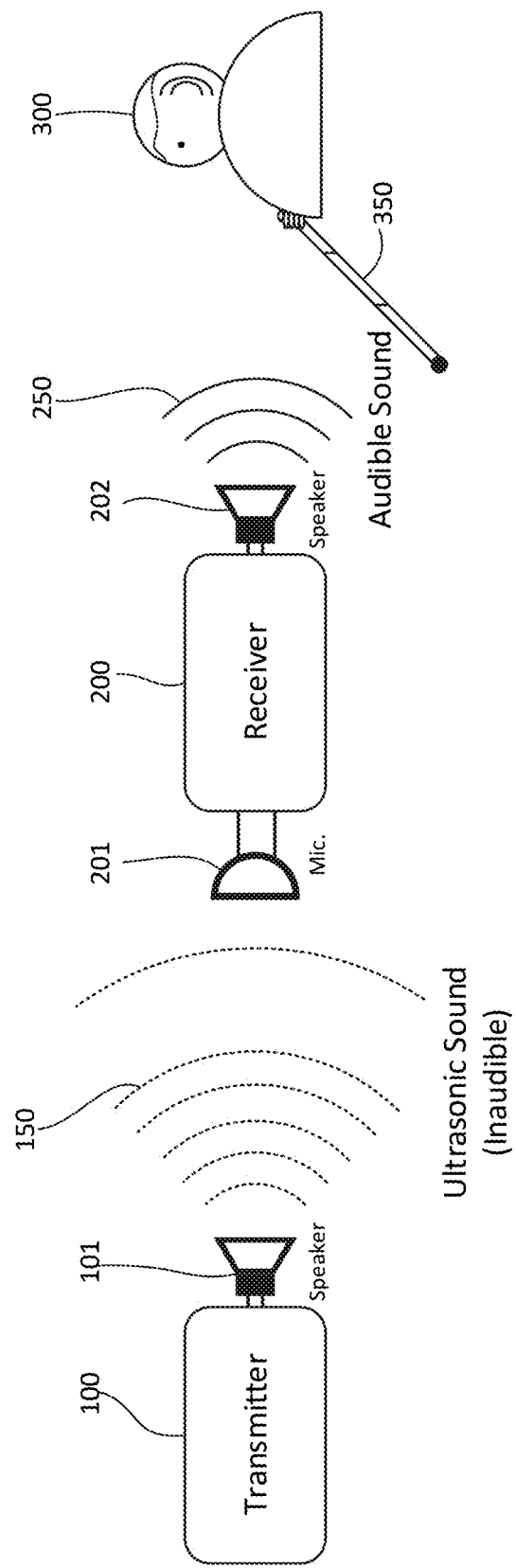
FIG. 1 illustrates a simplified schematic block diagram of an ultrasonic sound guide system for the visually impaired.

FIG. 1 illustrates a simplified schematic block diagram of an ultrasonic sound guide system for the visually impaired. The ultrasonic sound guide system consists of the transmitter 100 and the receiver 200. The transmitter 100 generates the inaudible ultrasonic sound 150 by using the speaker 101. The ultrasonic sound 150 is propagated into the air and received by the microphone 201 in the receiver 200. The receiver 200 transforms the ultrasonic sound 150 to the audible sound 250 by using the speaker 202. The visually impaired 300 use the receiver 200 to receive the information by audible sound 250 for identification and localization of the transmitter along with walking cane 350. The multiple receivers 200 can be operated simultaneously to localize and identify the multiple transmitters 100 in indoor and outdoor. The ultrasonic sound 150 represents the acoustic sound properties; hence, the overlap of the sound can be heard as the multiple sounds for the visually impaired 300.

Figure 2:
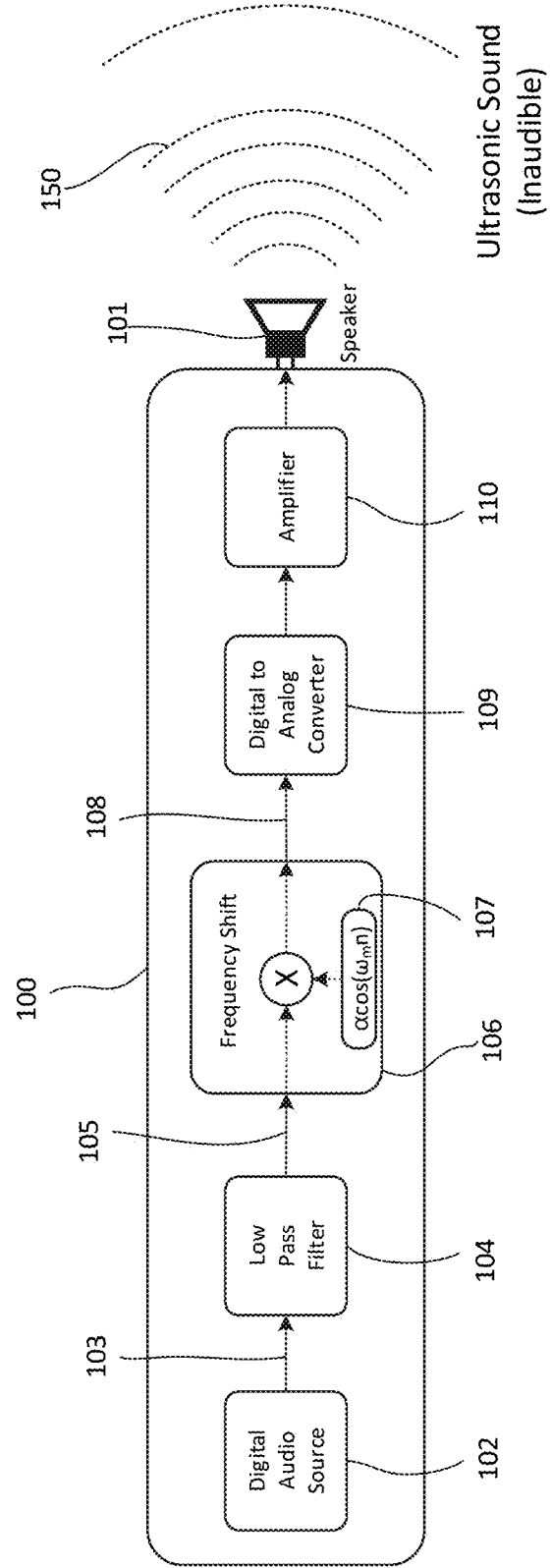
FIG. 2 illustrates a simplified schematic block diagram of a transmitter.

FIG. 2 illustrates a simplified schematic block diagram of a transmitter. The transmitter 100 delivers the audio information to the receiver 200 in FIG. 1. The audio information contains the acoustic signal to identify the places or locations such as room number. The analog audio signal is sampled and quantized by analog-to-digital converter with $f_s$ rate (samples per second) and B bit resolution (bits per sample). The digitized audio signal is stored in the memory as digital audio source 102. In every $1/f_s$ time interval, the digitized audio signal is transferred from the digital audio source over the digital communication line 103. The digitized audio signal is processed by the low pass filter 104 to limit the bandwidth of the audio signal. The filtered audio signal is transmitted from the low pass filter 104 over the digital communication line 105. The filtered audio signal is shifted to the desired frequency range by using the sinusoidal signal 107 for instance $\alpha \cos(\omega_m n)$. The $\alpha$ is the magnitude control coefficient and the $\omega_m$ is the shift amount parameter. Observe that the time in digital signal processing is represented by integer sequence number n and the actual time is specified as $n/f_s$. The radian frequency $\omega_m$ represents the frequency from the discrete time domain n with radian per sample unit. The relation between cyclic frequency f and radian frequency $\omega$ is below.

$$\omega = 2\pi f/f_s, f = \omega f_s/2\pi$$

The time domain multiplication (denoted by x in the diagram) in frequency shift 106 between the sinusoid 107 and filtered audio signal 105 performs the frequency shift for desired frequency relocation. The shifted audio signal is delivered from the frequency shift 106 by using the digital communication line 108. The shifted audio signal is converted to the analog signal by using the digital-to-analog converter 109. The analog signal is amplified by the amplifier 110. The amplified signal is transformed to the ultrasonic sound 150 by using the speaker 101. The operation frequency range of the amplifier 110 and speaker 101 should be extended to the desired ultrasonic bandwidth for accurate propagation of the ultrasonic sound 150.

Figure 3:
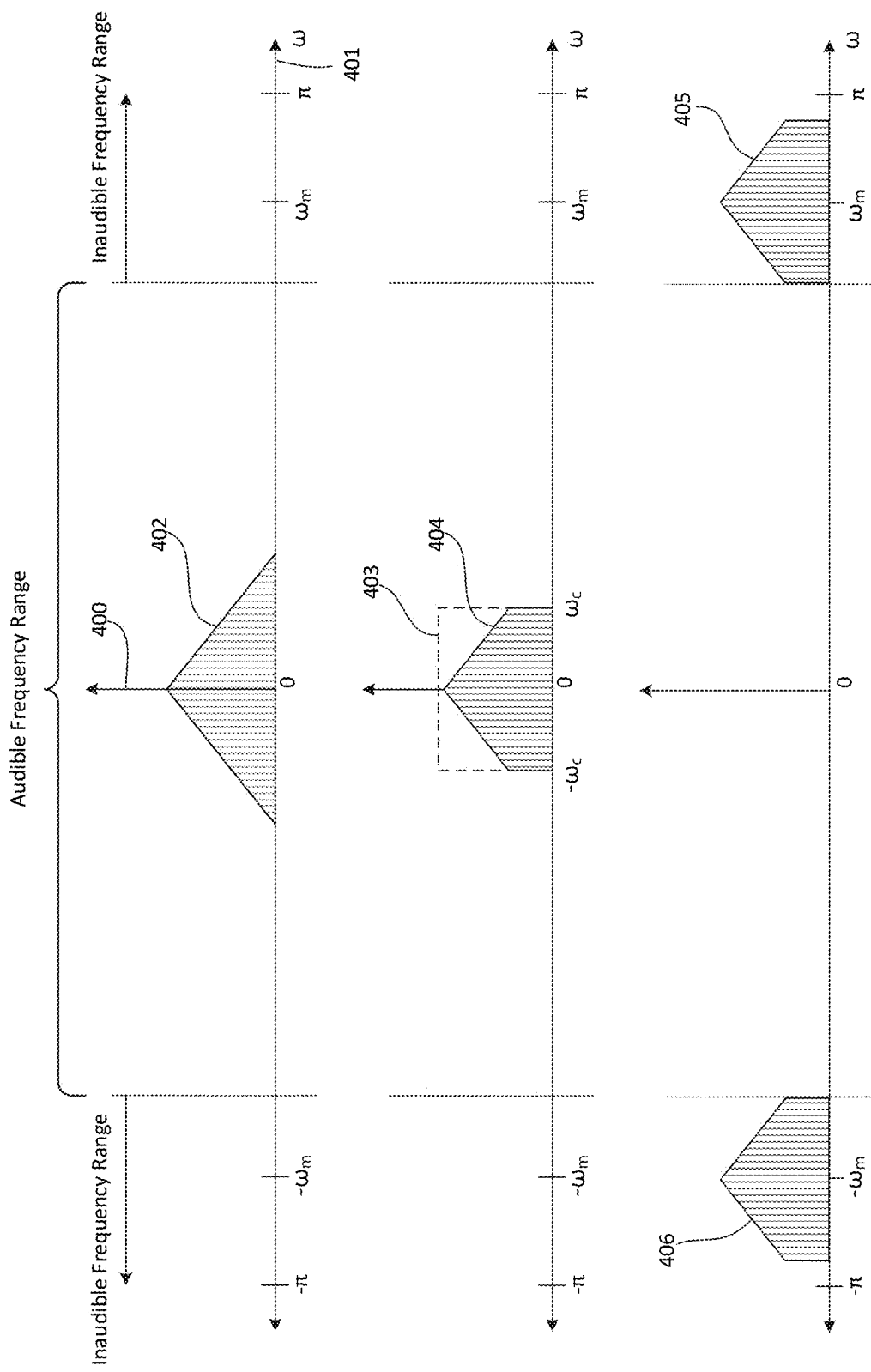
FIG. 3 illustrates a frequency distribution of an individual transmitter block.

FIG. 3 illustrates a frequency distribution of an individual transmitter block. The x axis 401 of each plot represents the radian frequency co and the y axis 400 of each plot specifies absolute signal magnitude of the given frequency. Due to the property of discrete Fourier transform, the frequency distribution demonstrates the even symmetric profile. Note that the upper audible frequency limit is the 20 kHz in general. The individual plot in FIG. 3 presents the range of audible and inaudible frequency. The triangular shape 402 in upper plot shows the frequency distribution of digitized audio signal in digital audio source 102 and digital communication line 103 on FIG. 2. The pentagon shape 404 in middle plot demonstrates the frequency distribution of filtered audio signal in digital communication line 105 on FIG. 2. The rectangular dotted line 403 in middle plot provides the frequency response of FIG. 2 low pass filter 104 which passes the signal up to $\omega_c$ frequency. Two shifted pentagon shapes 405 and 406 in bottom plot denote the frequency distribution of shifted audio signal in the digital communication line 108 on FIG. 2. The frequency shift 106 on FIG. 2 performs the frequency relocation in right and left direction with shift amount $\omega_m$. Observe that the shifted audio signal occupies the inaudible frequency range in bottom plot; therefore, naked ears cannot hear any audible sound from the transmitter 100 in FIG. 2.

Figure 4:
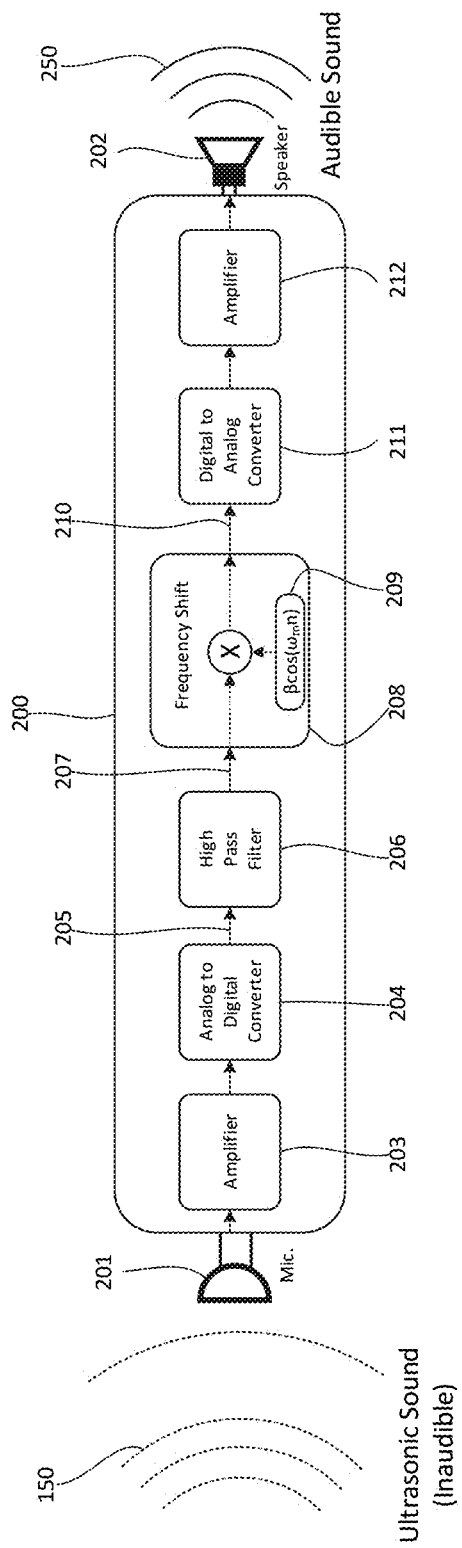
FIG. 4 illustrates a simplified schematic block diagram of a receiver.

FIG. 4 illustrates a simplified schematic block diagram of a receiver. The receiver 200 receives ultrasonic sound 150 which contains the audio information and converts to the audible sound 250 for the visually impaired. The microphone 201 accepts the ultrasonic sound 150 and the amplifier 203 magnifies the received analog signal for further processing. The analog signal is sampled and quantized in real time by analog-to-digital converter 204 with $f_s$ rate (samples per second) and B bit resolution (bits per sample). The digitized signal is transferred to the high pass filter 206 by using the digital communication line 205. The high pass filter 206 passes the ultrasonic frequency signal and blocks the audible frequency range. The filtered ultrasonic signal is transmitted from the high pass filter 206 over the digital communication line 207. The filtered ultrasonic signal is shifted to the desired frequency range by using the sinusoidal signal 209 for instance $\beta \cos(\omega_m n)$. The $\beta$ is the magnitude control coefficient and the $\omega_m$ is the shift amount parameter. The time domain multiplication (denoted by x in the diagram) in frequency shift 208 between the sinusoid 209 and filtered ultrasonic signal 207 performs the frequency shift for desired frequency relocation. The shifted audio signal is delivered from the frequency shift 208 by using the digital communication line 210. The shifted audio signal is converted to the analog signal by using the digital-to-analog converter 211. The analog signal is amplified by the amplifier 212. The amplified signal is transformed to the audible sound 250 by using the speaker 202. Note that the receiver 200 should be responded rapidly for user safety; hence, all operations are performed in real time to minimize the latency.

Figure 5:
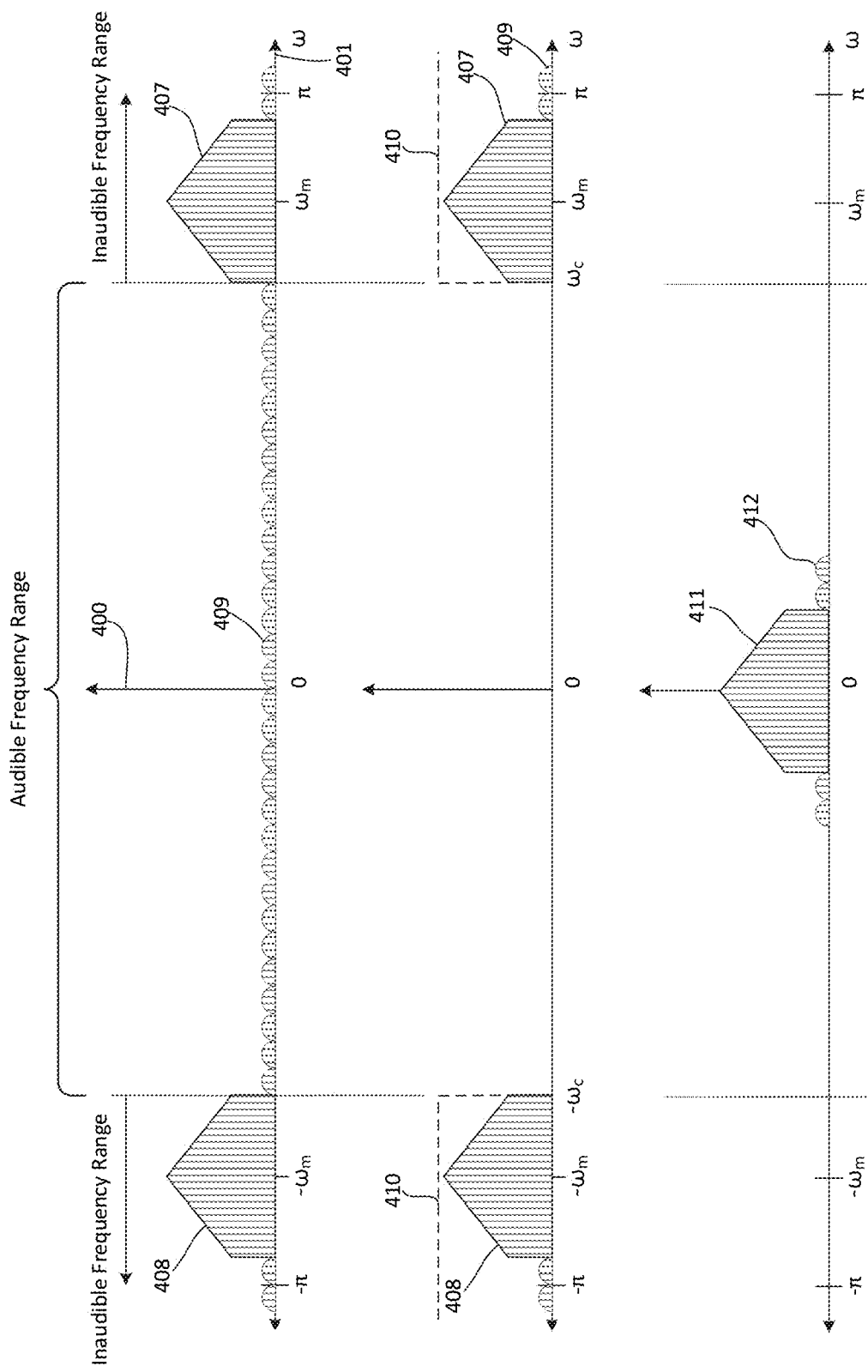
FIG. 5 illustrates a frequency distribution of an individual receiver block.

FIG. 5 illustrates a frequency distribution of an individual receiver block. The x axis 401 of each plot represents the radian frequency $\omega$ and the y axis 400 of each plot specifies absolute signal magnitude of the given frequency. The upper plot demonstrates the frequency distribution of the digitized received signal in digital communication line 205 on FIG. 4. The pentagon shapes 407 and 408 are induced from the propagated transmitter signal and occupied the inaudible frequency range. The ripples 409 are wideband received noise from the ambient and microphone. The received noise 409 is partially removed in middle plot by using the FIG. 4 high pass filter 206 which passes the signal above $\omega_c$ frequency. The dotted lines 410 in middle plot provide the frequency response of FIG. 4 high pass filter 206. The pentagon shape 411 in bottom plot indicates the frequency distribution of shifted signal in the digital communication line 210 on FIG. 4. The frequency shift 208 on FIG. 4 performs the frequency relocation in right and left direction with shift amount $\omega_m$. One of the shift directions on pentagon shapes 407 and 408 is arranged and superimposed around the zero frequency as the pentagon shape 411. Certain residual noise may be shifted to the zero frequency as shown in ripple 412. The shifted signal is placed in the audible frequency range in bottom plot; hence, the visually impaired can hear the audible information from the receiver 200 in FIG. 4.

Figure 6:
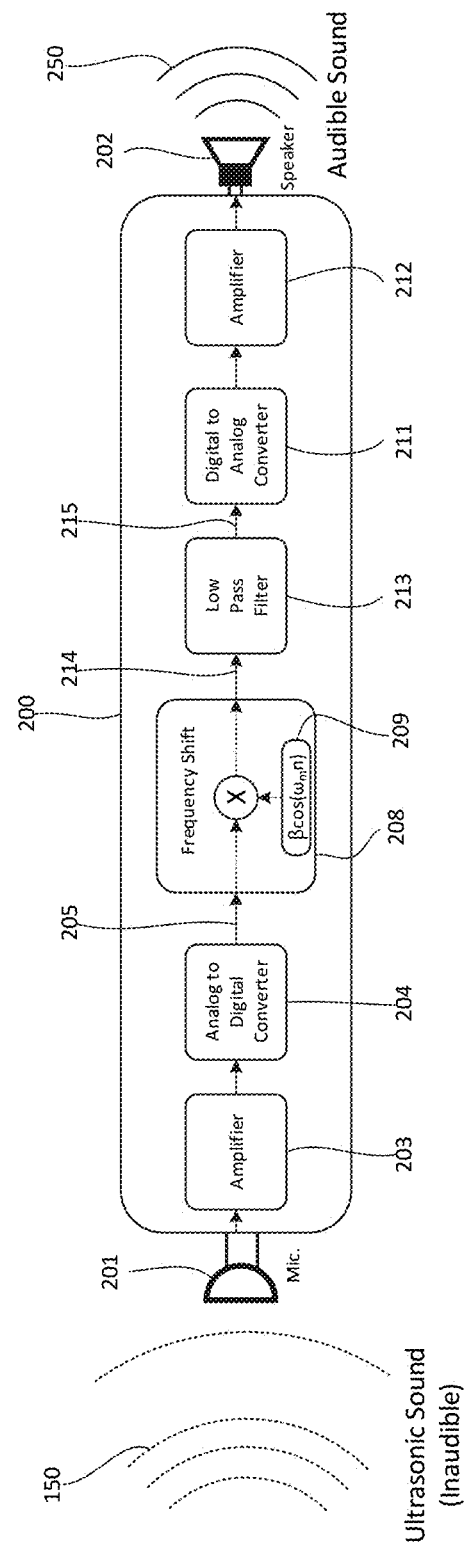
FIG. 6 illustrates an alternative simplified schematic block diagram of a receiver.

FIG. 6 illustrates an alternative simplified schematic block diagram of a receiver. In the receiver 200, the microphone 201 accepts the ultrasonic sound 150 and the amplifier 203 magnifies the received analog signal. The analog signal is sampled and quantized in real time by analog-to-digital converter 204. The digitized signal is transferred to the frequency shift 208 by using the digital communication line 205. The digitized signal is shifted to the desired frequency range by using the sinusoidal signal 209 for instance $\beta \cos(\omega_m n)$. The time domain multiplication (denoted by x in the diagram) in frequency shift 208 between the sinusoid 209 and digitized signal 205 performs the frequency shift for desired frequency relocation. The shifted signal is delivered from the frequency shift 208 by using the digital communication line 214. The low pass filter 213 passes the audible frequency signal and blocks the high frequency component. The filtered audio signal is transmitted from the low pass filter 213 over the digital communication line 215. The filtered audio signal is converted to the analog signal by using the digital-to-analog converter 211. The analog signal is amplified by the amplifier 212. The amplified signal is transformed to the audible sound 250 by using the speaker 202. The alternative receiver realization includes the low pass filter 213 instead of FIG. 4 high pass filter 206 with forwarded frequency shift 208 location.

Figure 7:
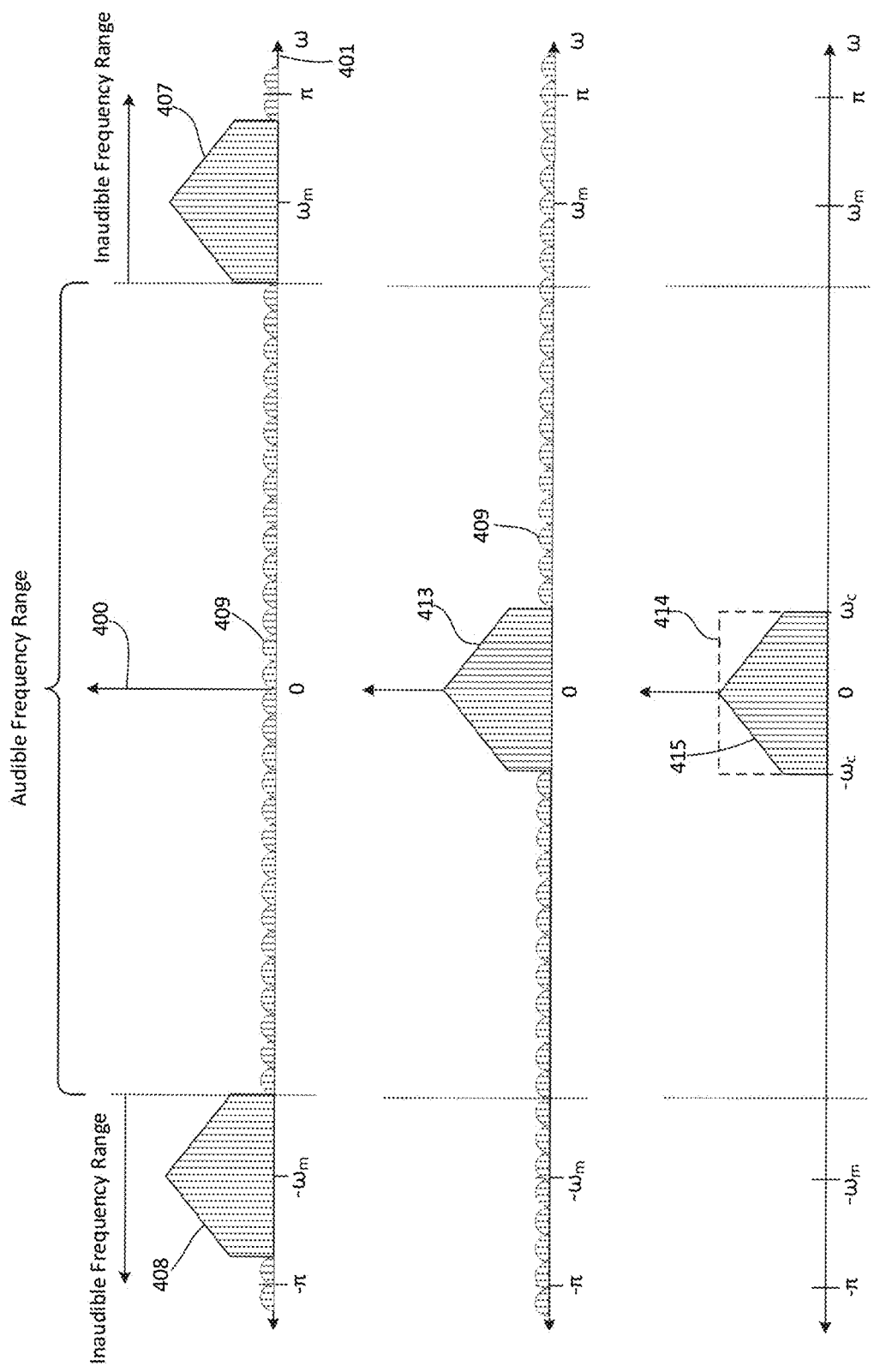
FIG. 7 illustrates a frequency distribution of an individual receiver block for an alternative realization.

FIG. 7 illustrates a frequency distribution of an individual receiver block for an alternative realization. The x axis 401 of each plot represents the radian frequency ω and the y axis 400 of each plot specifies absolute signal magnitude of the given frequency. The upper plot demonstrates the frequency distribution of the digitized received signal in digital communication line 205 on FIG. 6. The pentagon shapes 407 and 408 are induced from the propagated transmitter signal and occupied the inaudible frequency range. The ripples 409 are wideband received noise from the ambient and microphone. The pentagon shape 413 in middle plot indicates the frequency distribution of shifted signal in the digital communication line 214 on FIG. 6. The frequency shift 208 on FIG. 6 performs the frequency relocation in right and left direction with shift amount $\omega_m$. One of the shift directions on pentagon shapes 407 and 408 is arranged and superimposed around the zero frequency as the pentagon shape 413. The received and shifted noise 409 is removed in bottom plot by using the FIG. 6 low pass filter 213 which passes the signal up to $\omega_c$ frequency. The rectangular dotted line 414 in bottom plot provides the frequency response of FIG. 6 low pass filter 213. The clean shifted signal 415 is placed in the audible frequency range in bottom plot; hence, the visually impaired can hear the audible information from the receiver 200 in FIG. 6.

Figure 8:
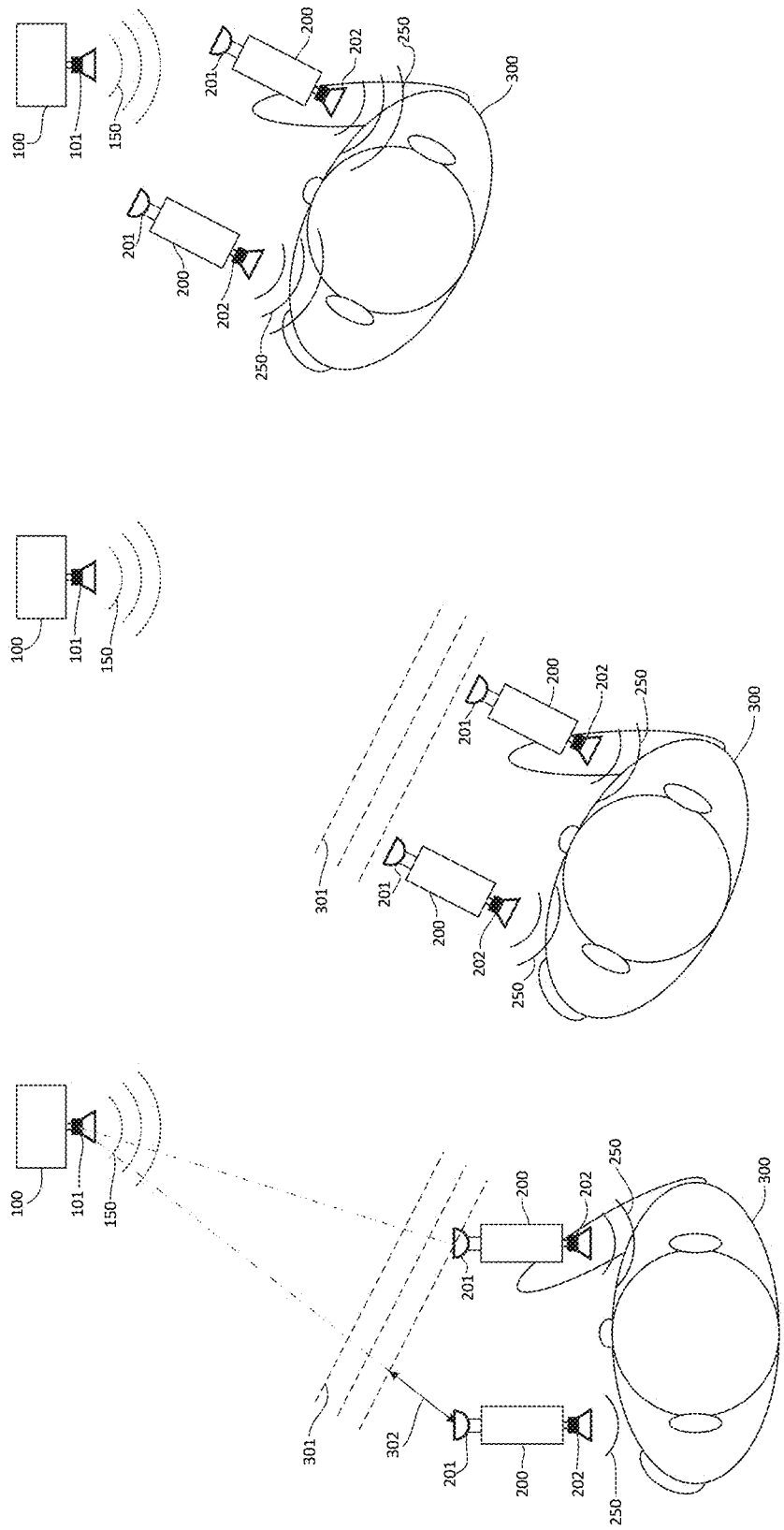
FIG. 8 illustrates a working example of dual channel device for the visually impaired to localize the transmitter.

FIG. 8 illustrates a working example of dual channel device for the visually impaired to localize the transmitter. The dual channel device represents the receiver device with two independent processing from two microphones to two speakers. On individual microphone, each channel performs the receiver operations shown in FIG. 4 or FIG. 6 to deliver the audible information by using the speaker. The distance between the microphones is approximately equivalent to the distance between the ears. The speakers are placed nearby the ears with open structure in order to hear the sound difference between channels in magnitude and delay. Note that the acoustic flow of the ear should not be blocked by the receiver system to maintain the spatial acoustic sensing of the visually impaired. FIG. 8 demonstrates the sound guide processing by the user based on the dual channel device. Three pictures are shown horizontally in temporal order from the left. The left, middle, and right picture contain the identical configuration as below. The transmitter 100 broadcasts the ultrasonic sound 150 by using the speaker 101. The ultrasonic sound 150 is propagated into the air and the wavefront of the ultrasonic sound exhibits the plane wave 301 in far field. The visually impaired 300 possess the dual channel device in parallel to ear line. The dual channel device includes the two microphones 201, two receivers 200, and two speakers 202 in symmetric fashion. The receiver speakers 202 are located nearby the individual ear of visually impaired 300. In the left picture, the user 300 is positioned at the far location with indirect direction and received the audible sound 250 from the transmitter 100 for location identification. The user 300 experiences the audible sound 250 difference between the receiver speakers 202 due to the direction of dual channel device. The direct distance difference 302 between speaker 101 and microphones 201 creates the audible sound 250 difference in magnitude and delay. The human binaural sound localization capability perceives the direction of transmitter speaker 101 and the user 300 turns the body direction toward the transmitter 100 in middle picture. The user 300 in the middle picture faces toward the transmitter 100 and experiences the even audible sound 250 in level and delay from the receiver speakers 202. The user 300 in right picture approaches to the transmitter 100 for higher audible sound 250 level and understands the user's location arrived at the destination.

Figure 9:
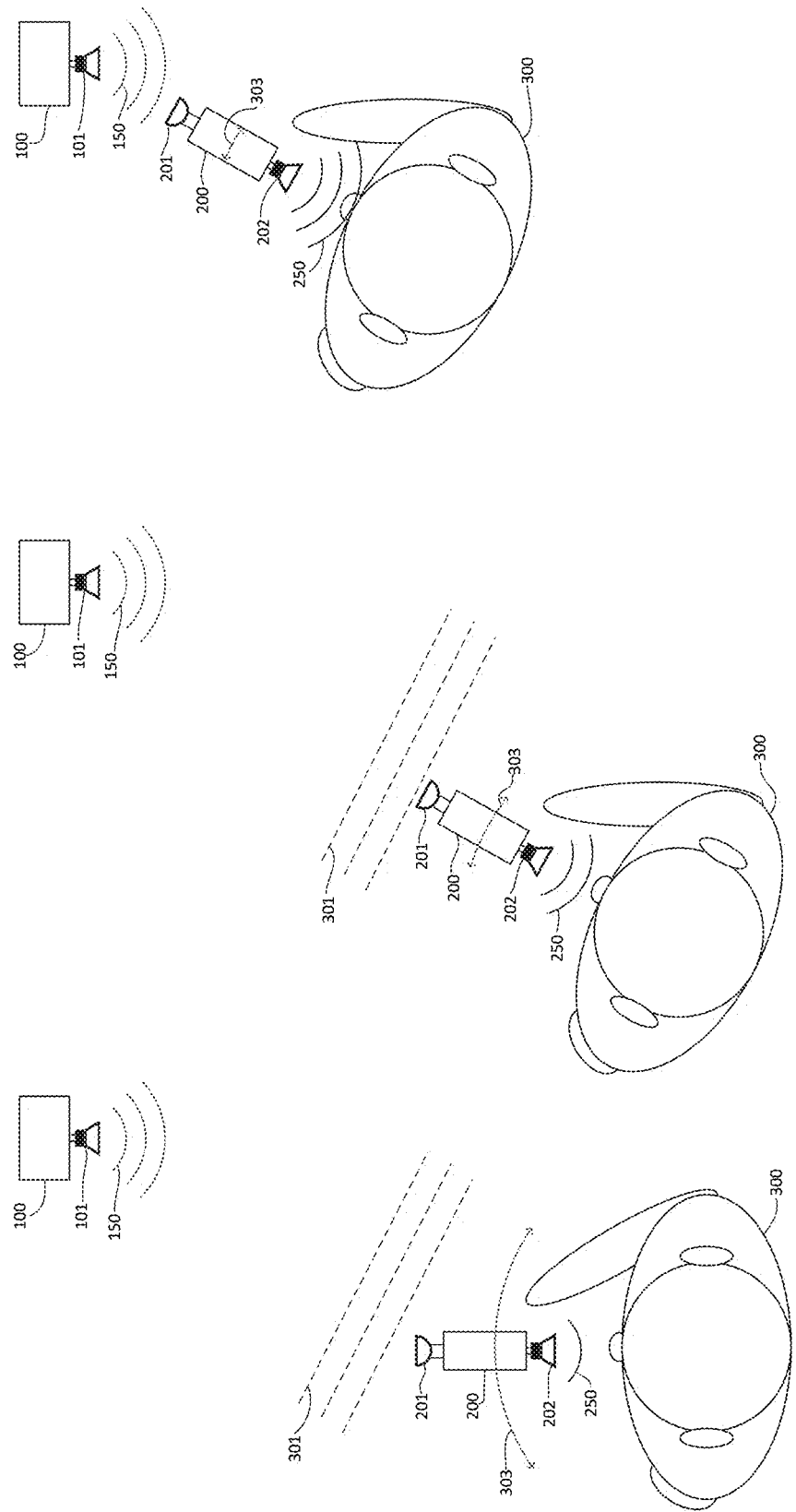
FIG. 9 illustrates a working example of single channel device for the visually impaired to localize the transmitter.

FIG. 9 illustrates a working example of single channel device for the visually impaired to localize the transmitter. The single channel device indicates the receiver device with single microphone and single speaker. The single channel device is carried by the user hand or attached on the walking cane. The physical swing motion of the receiver creates the sound level difference based on the receiver direction and distance from the transmitter. FIG. 9 demonstrates the sound guide processing by the user based on the single channel device. Three pictures are shown horizontally in temporal order from the left. The left, middle, and right picture contain the identical configuration as below. The transmitter 100 broadcasts the ultrasonic sound 150 by using the speaker 101. The ultrasonic sound 150 is propagated into the air and the wavefront of the ultrasonic sound exhibits the plane wave 301 in far field. The visually impaired 300 possess the single channel device in user hand or on walking cane. The single channel device contains the microphone 201, receiver 200, and speaker 202. In the left picture, the user 300 is positioned at the far location with indirect direction and received the audible sound 250 from the transmitter 100 for location identification. The user 300 initiates the receiver swing motion 303 and experiences the audible sound 250 difference from the receiver speaker 202 due to the receiver direction. Once the user 300 recognizes the highest sound level direction, the user 300 turns the body direction toward the transmitter 100 in middle picture. The user 300 in the middle picture faces toward the transmitter 100 and generates the minor swing motion 303 continuously for seeking the highest audible sound 250 level from the receiver speaker 202. The user 300 in right picture approaches to the transmitter 100 for higher audible sound 250 level and understands the user's location arrived at the destination.

Figure 10:
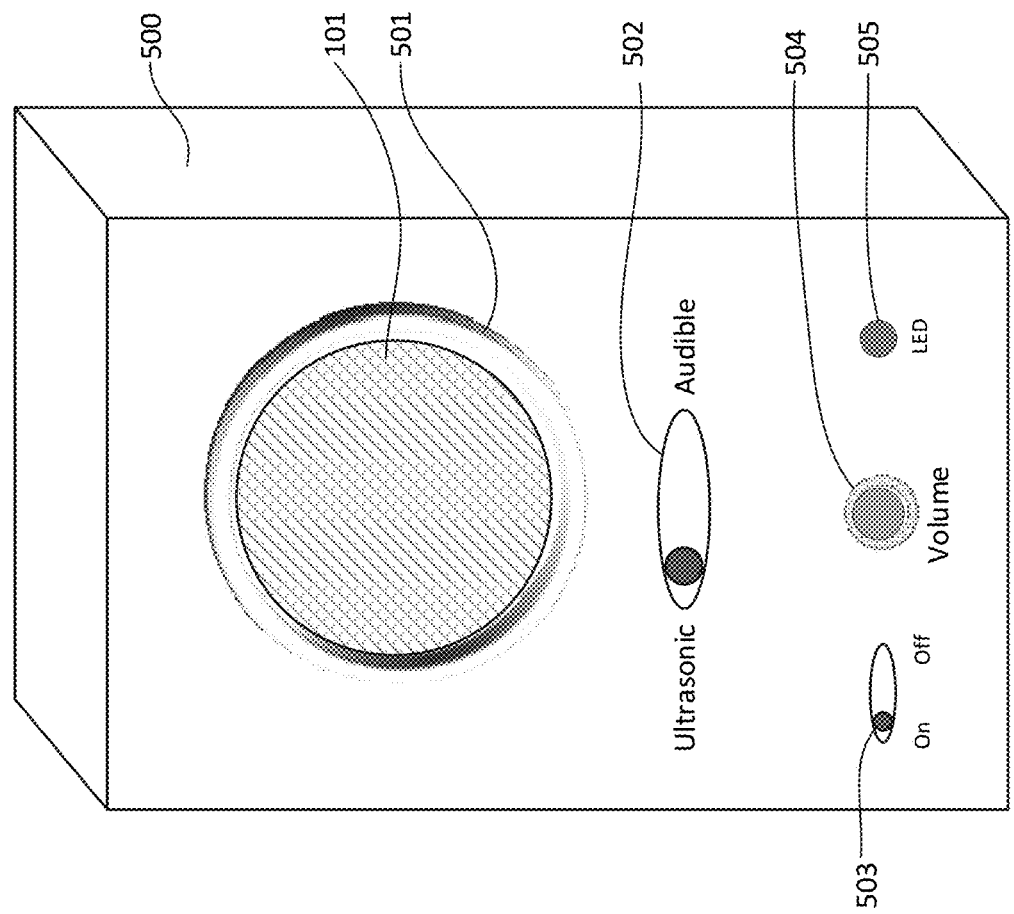
FIG. 10 illustrates an embodiment of transmitter.

FIG. 10 illustrates an embodiment of transmitter. The physical structure of the transmitter can be realized in various format and this figure demonstrates one example of the realization. The transmitter is protected by the weatherproof case 500 which contains the circuit boards and power system inside. The transmitter speaker 101 is located under the acoustic hole on the case 500. The transmitter may have acoustic guide ring 501 on the speaker cone edge to control the ultrasonic sound directivity. The sound mode switch 502 selects the output sound between audible and ultrasonic mode for testing the system by naked ears. The volume knob 504 regulates the magnitude of ultrasonic and audible sound level from the transmitter speaker 101. The power switch 503 turns the transmitter system on and off. The LED (Light-emitting diode) 505 indicates the transmitter system power status.

Figure 11:
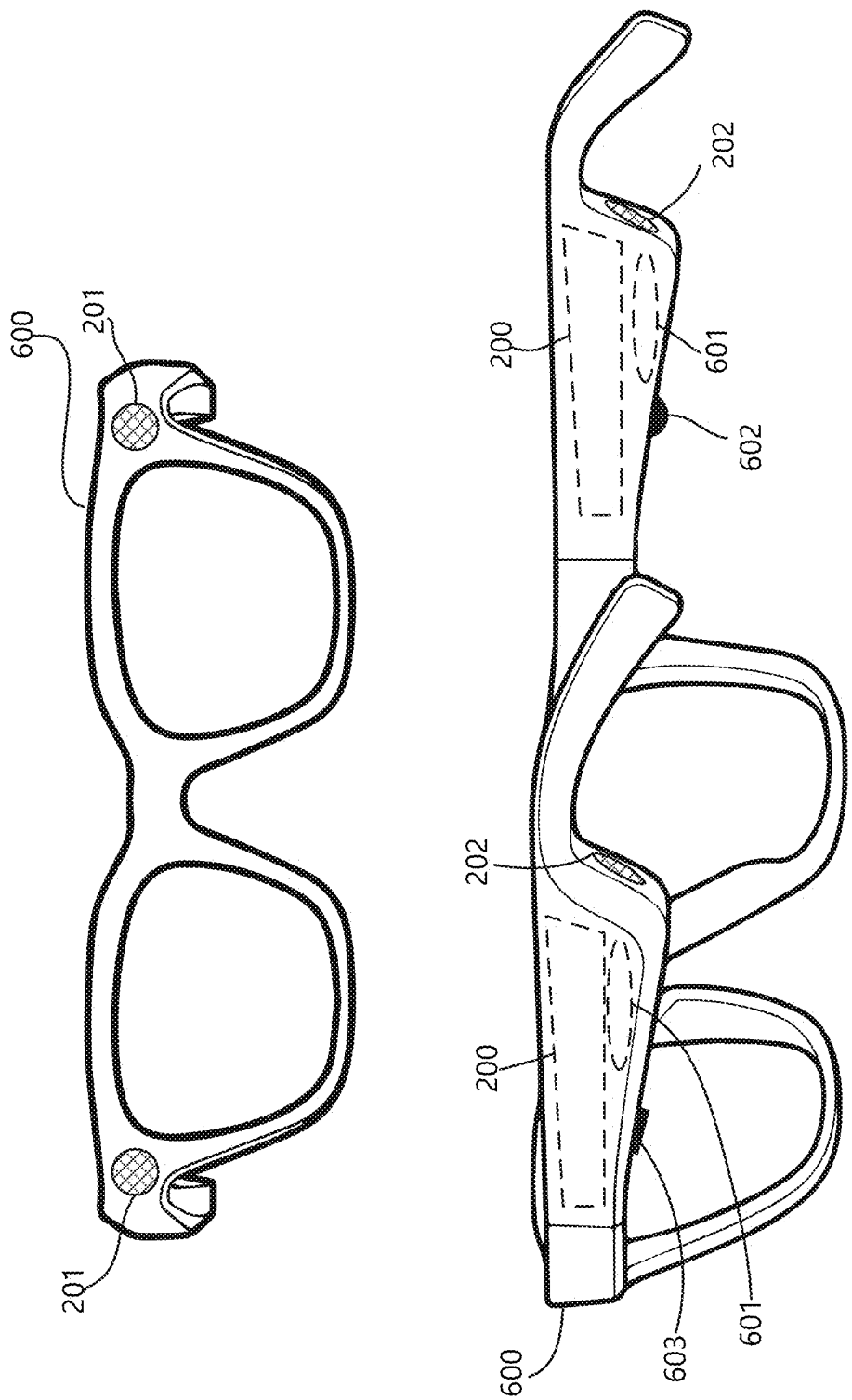
FIG. 11 illustrates a receiver embodiment in eyeglasses shape.

FIG. 11 illustrates a receiver embodiment in eyeglasses shape. The eyeglasses receiver device 600 presents the one realization of dual channel device. The individual temple of the eyeglasses receiver device contains each channel receiver in symmetric manner. Two microphones 201 of the receiver device are located at the left-end and right-end of rim front in the eyeglasses receiver device. The receiver hardware 200 and battery systems 601 are placed within the eyeglasses receiver device temples. Two speakers 202 of the receiver device are located at the back end of temples nearby the user ears. The charging port 603 is placed at the one temple and power switch 602 is located at the other temple of the eyeglasses receiver device.

Figure 12:
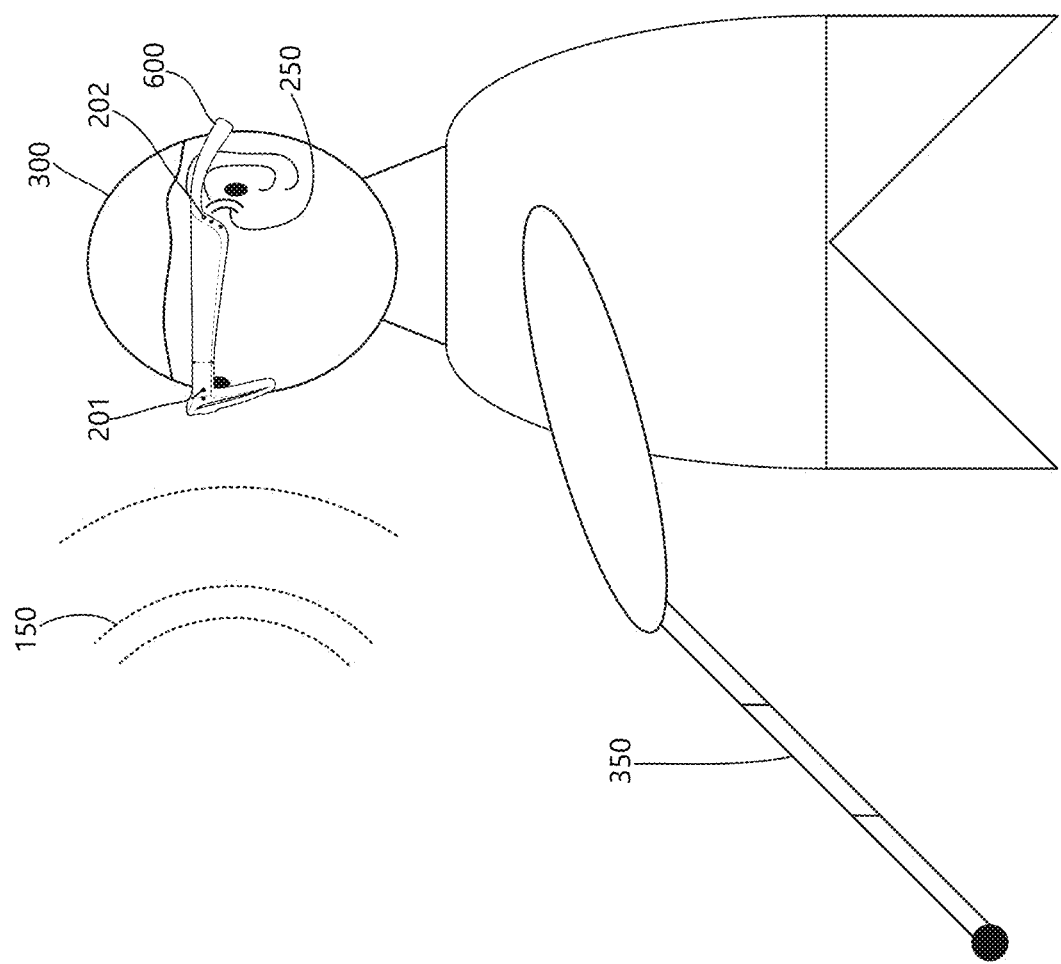
FIG. 12 illustrates a wearing example of eyeglasses receiver device.

FIG. 12 illustrates a wearing example of eyeglasses receiver device. The visually impaired 300 wears the eyeglasses receiver device 600 and holds the walking cane 350 on one hand. Note that the one side of the eyeglasses receiver device is shown in the figure and the other side is symmetrical and identical. Two microphones 201 of the eyeglasses receiver device accept the ultrasonic sound 150 from the transmitter. The receiver system converts from the ultrasonic sound 150 to the audible sound 250 emitted by receiver speakers 202. Based on the dual channel device, the method to localize and approach to the transmitter is explained and illustrated in FIG. 8.

Figure 13:
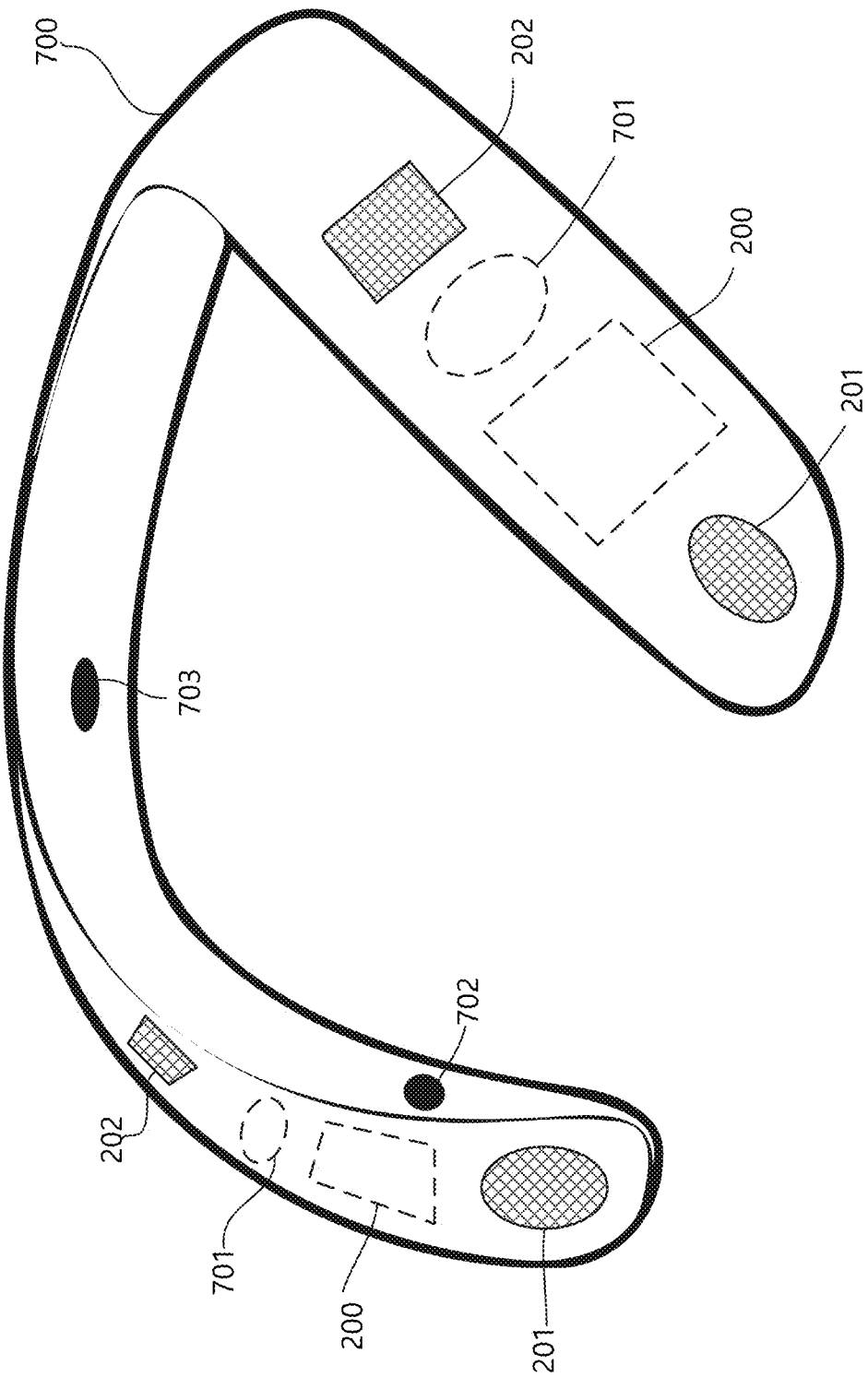
FIG. 13 illustrates a receiver embodiment in neckband shape.

FIG. 13 illustrates a receiver embodiment in neckband shape. The neckband receiver device 700 presents the one realization of dual channel device. The individual wing of the neckband receiver device contains each channel receiver in symmetric manner. Two microphones 201 of the receiver device are located at the left-end and right-end of wing front in the neckband receiver device. The receiver hardware 200 and battery systems 701 are placed within the neckband receiver device wings. Two speakers 202 of the receiver device are located at the back end of wings nearby the user ears. The charging port 703 and power switch 702 are placed at any locations of the neckband receiver device.

Figure 14:
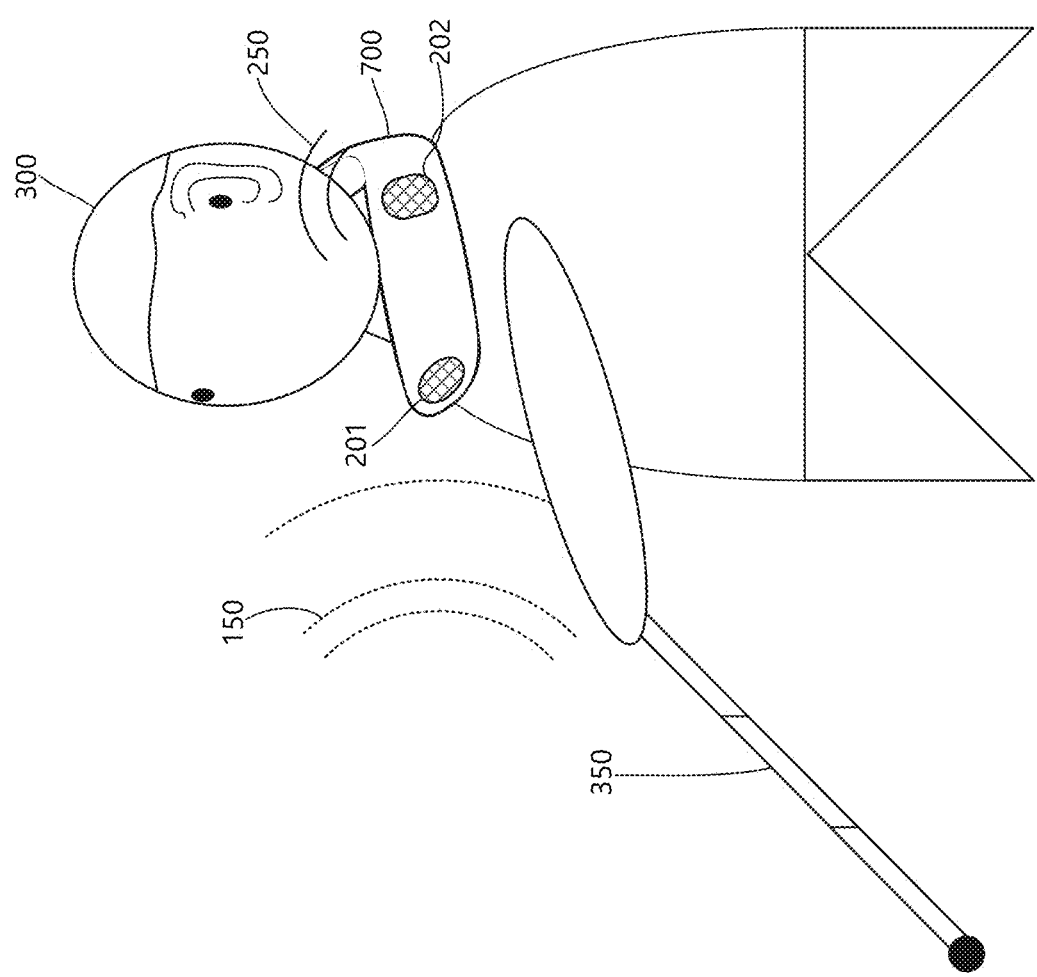
FIG. 14 illustrates a wearing example of neckband receiver device.

FIG. 14 illustrates a wearing example of neckband receiver device. The visually impaired 300 wears the neckband receiver device 700 and holds the walking cane 350 on one hand. Note that the one side of the neckband is shown in the figure and the other side is symmetrical and identical. Two microphones 201 of the neckband receiver device accept the ultrasonic sound 150 from the transmitter. The receiver system converts from the ultrasonic sound 150 to the audible sound 250 emitted by receiver speakers 202. Based on the dual channel device, the method to localize and approach to the transmitter is explained and illustrated in FIG. 8.

Figure 15:
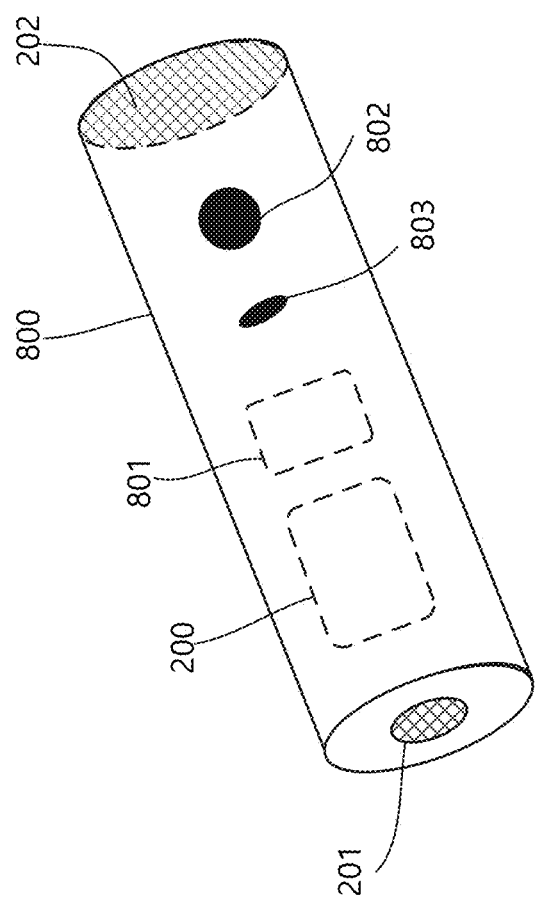
FIG. 15 illustrates a receiver embodiment in hand-held device shape.

FIG. 15 illustrates a receiver embodiment in hand-held device shape. The hand-held receiver device 800 presents the one realization of single channel device. One microphone 201 of the receiver device is located at the hand-held receiver device front side. The receiver hardware 200 and battery system 801 are placed within the hand-held receiver device body. One speaker 202 of the receiver device is located at hand-held receiver device back side. Observe that the single channel device estimates the transmitter location by using the swing motion; therefore, the speaker can be inserted in any location as long as the audible sound can be heard by the user. Further information on swing motion can be found at FIG. 9. The charging port 803 and power switch 802 are placed at any locations of the hand-held receiver device.

FIG. 16 illustrates a using example of hand-held receiver device. The hand-held receiver device can be used as the attached device on walking cane or independent device on user hand. The left and right figure of FIG. 16 demonstrate the attached and independent device mode example, respectively. The attached device mode creates the swing by controlling the walking cane motion. In the independent device mode, the user holds the walking cane in one hand and the hand-held receiver device in the other hand. The swing motion is generated by the horizontal hand action. Note that the left and right figure of FIG. 16 show the identical configuration except the hand-held receiver device location. The visually impaired 300 utilizes the hand-held receiver device 800 in attached device mode on left figure and in independent device mode on right figure. The visually impaired 300 also holds the walking cane 350 on one hand. One microphone 201 of the hand-held receiver device accepts the ultrasonic sound 150 from the transmitter. The receiver system converts from the ultrasonic sound 150 to the audible sound 250 emitted by receiver speaker 202. Based on the single channel device, the method to localize and approach to the transmitter is explained and illustrated in FIG. 9.

Figure 17:
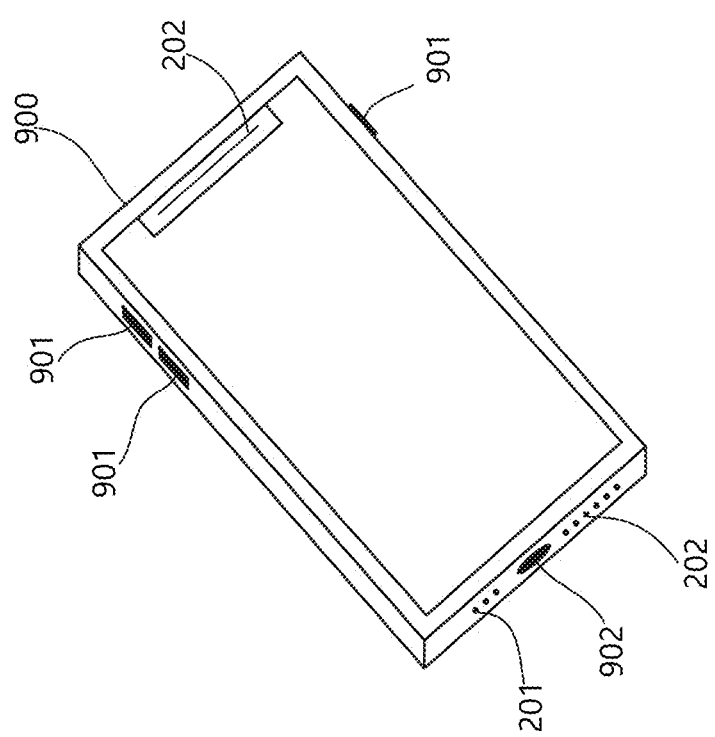
FIG. 17 illustrates a receiver embodiment in smartphone shape.

FIG. 17 illustrates a receiver embodiment in smartphone shape. The smartphone receiver device 900 presents the one realization of single channel device. The smartphone receiver device utilizes the smartphone hardware and implements the single channel device by using the application software. No additional attached hardware is required in smartphone receiver device. Single or multiple microphones 201 of the smartphone are established for receiver microphones. Single or multiple speakers 202 of the smartphone are employed as receiver speakers. Note that the single channel device estimates the transmitter location by using the swing motion; therefore, the speakers can be placed in any locations as long as the audible sound can be heard by the user. Further information on swing motion can be found at FIG. 9. The charging port 902 is used for battery charging and the multiple push switches 901 can be used for power and volume control.

FIG. 18 illustrates a using example of smartphone receiver device. The smartphone receiver device can be used as the attached device on walking cane or independent device on user hand. The left and right figure of FIG. 18 demonstrate the attached and independent device mode example, respectively. The attached device mode creates the swing by controlling the walking cane motion. In the independent device mode, the user holds the walking cane in one hand and the smartphone receiver device in the other hand. The swing motion is generated by the horizontal hand action. Note that the left and right figure of FIG. 18 show the identical configuration except the smartphone receiver device location. The visually impaired 300 utilizes the smartphone receiver device 900 in attached device mode on left figure and in independent device mode on right figure. The visually impaired 300 also holds the walking cane 350 on one hand. Single or multiple microphones 201 of the smartphone receiver device accepts the ultrasonic sound 150 from the transmitter. The receiver system converts from the ultrasonic sound 150 to the audible sound 250 emitted by receiver speakers 202. Based on the single channel device, the method to localize and approach to the transmitter is explained and illustrated in FIG. 9.

The invention claimed is:

1. An ultrasonic sound guide system for the visually impaired comprising:
   at least one transmitter configured to
      retrieve a pre-recorded digital audio signal from a digital memory,
      modify said pre-recorded digital audio signal to produce an ultrasonic signal, and
      transmit an ultrasonic sound into the air from said ultrasonic signal; and
   at least one receiver configured to
      receive said ultrasonic sound by using a microphone to produce a received ultrasonic signal, magnify said received ultrasonic signal by using an analog amplifier for a magnified ultrasonic signal, modify said magnified ultrasonic signal to recover an audio signal originated from said pre-recorded digital audio signal in said transmitter, and transmit an audio sound into the air from said audio signal.

2. The system according to claim 1, wherein said modification in said transmitter is configured to be carried by a digital low pass filter, a digital frequency shift, and a digital-to-analog converter.

3. The system according to claim 1, wherein said modification in said transmitter is configured to be carried by a digital-to-analog converter, an analog low pass filter, and an analog frequency shift.

4. The system according to claim 1, wherein said modification in said receiver is configured to be carried by an analog-to-digital converter, a digital high pass filter, a digital frequency shift, and a digital-to-analog converter.

5. The system according to claim 1, wherein said modification in said receiver is configured to be carried by an analog high pass filter, and an analog frequency shift.

6. The system according to claim 1, wherein said modification in said receiver is configured to be carried by an analog-to-digital converter, a digital frequency shift, a digital low pass filter, and a digital-to-analog converter.

7. The system according to claim 1, wherein said modification in said receiver is configured to be carried by an analog frequency shift and an analog low pass filter.

8. The system according to claim 1, wherein said transmission in said transmitter is configured to be carried by an analog amplifier and a speaker.

9. The system according to claim 1, wherein said transmission in said receiver is configured to be carried by an analog amplifier and a speaker.

10. An embodiment of said transmitter in claim 1 comprising:

a protective case containing a circuit boards and power system inside;

said speaker transmitting said ultrasonic sound to said receiver, wherein an acoustic guide ring is located on a cone edge of said speaker to control an ultrasonic sound directivity;

a sound mode switch selecting an output sound between audible and ultrasonic mode for testing said transmitter by naked ears; and a volume knob regulating a magnitude of audible and ultrasonic sound from said speaker.

11. The system according to claim 1, wherein two said receivers further comprise a dual channel device, wherein said dual channel device is worn by a user;

wherein the distance between two said microphones in two said receivers is equivalent to the distance between said user's two ears; and wherein two said speakers in two said receivers are placed nearby said user's two ears, respectively.

12. A method of transmitter localization by said user using said dual channel device in claim 11 comprising:

accepting said transmitter's said ultrasonic sound by using two said microphones in said dual channel device with individual distance and direction;

independently converting said ultrasonic sounds by using two said receivers into said audio sounds for two said speakers in said dual channel device;

perceiving said audio sounds from said speakers by said user for location identification;

experiencing a sound difference in magnitude and time between said speakers by said user;

recognizing a direction of said transmitter by said user from said sound difference based on a human binaural sound localization capability;

turning said user's body and/or said dual channel device's direction toward said transmitter;

approaching to said transmitter by said user for even and stronger said audio sounds from two said speakers in said dual channel device; and understanding an arrival on said transmitter by said user for highest audio sound level from two said speakers in said dual channel device.

13. An embodiment of claim 11 said dual channel device in an eyeglasses shape comprising:

two temples of eyeglasses containing two said receivers, wherein a battery system is placed within said temples;

two said microphones located at the left-end and right-end of rim front in said eyeglasses for maintaining the distance between said user's two ears; and two said speakers located at the back end of said temples nearby said user's ears, respectively.

14. An embodiment of claim 11 said dual channel device in a neckband shape comprising:

two neckband wings containing two said receivers, wherein a battery system is placed within said wings;

two said microphones located at the left-end and right-end of wing front in said neckband for maintaining the distance between said user's two ears; and two said speakers located at the back end of said wings nearby said user's ears, respectively.

15. The system according to claim 1, wherein one said receiver further comprises a single channel device, wherein said single channel device is carried by said user;

wherein said microphone is located at the one end of said single channel device for reception of said ultrasonic sound; and wherein said speaker is placed at said single channel device for delivering said audio sound to said user.

16. A method of transmitter localization by said user using said single channel device in claim 15 comprising:

accepting said transmitter's said ultrasonic sound by said microphone in said single channel device;

converting said ultrasonic sound into said audio sound for said speaker in said single channel device;

perceiving said audio sound from said speaker by said user for the location identification;

initiating a swing motion on said single channel device by said user for the transmitter localization;

experiencing a sound magnitude difference from said speaker in said single channel device due to the device direction by said user;

recognizing the highest sound magnitude direction by said user;

turning said user's body and/or said single channel device's direction toward said transmitter;

performing the walking and swing motion continuously by said user for seeking the highest sound magnitude from said speaker in said single channel device; and understanding an arrival on said transmitter by said user for highest audio sound level from said speaker in said single channel device.

17. An embodiment of claim 15 single channel device in a hand-held device shape comprising:

a hand-held device body containing said receiver, wherein a battery system is placed within said hand-held device body;

said microphone located at said hand-held device one side; and said speaker located at said hand-held device another side.

18. An embodiment of claim 15 single channel device in a smartphone comprising:
- a smartphone device, and
    - wherein said smartphone includes
        - at least one microphone which can receive said ultrasonic sound;
        - at least one speaker which delivers said audio sound to said user;
- an application software for said smartphone,
    - wherein said application software performs said receiver operations by software realization.

19. At least one said transmitter in claim 1 is configured to be placed at a destination of personal navigation for delivering a location identification and localization on said audio sound by continuous and selective broadcasting of said ultrasonic sound to said single channel devices and/or said dual channel devices of said users.

* * * * *